United States Patent
Han et al.

(10) Patent No.: US 11,615,213 B2
(45) Date of Patent: Mar. 28, 2023

(54) ENCRYPTED DATA STORAGE SYSTEM AND METHOD BASED ON OFFSITE KEY STORAGE

(71) Applicant: ANHUI ASKY QUANTUM TECHNOLOGY CO., LTD., Anhui (CN)

(72) Inventors: Zhengfu Han, Anhui (CN); Jianfeng Wang, Anhui (CN); Chunhua Miao, Anhui (CN); Kai Yin, Anhui (CN); Jingjing Liu, Anhui (CN); Yun Liu, Anhui (CN)

(73) Assignee: ANHUI ASKY QUANTUM TECHNOLOGY CO., LTD., Anhui (CN)

( * ) Notice: Subject to any disclaimer, the term of this patent is extended or adjusted under 35 U.S.C. 154(b) by 398 days.

(21) Appl. No.: 16/650,644

(22) PCT Filed: Jul. 23, 2018

(86) PCT No.: PCT/CN2018/096702
§ 371 (c)(1),
(2) Date: Mar. 25, 2020

(87) PCT Pub. No.: WO2019/062298
PCT Pub. Date: Apr. 4, 2019

(65) Prior Publication Data
US 2020/0250347 A1    Aug. 6, 2020

(30) Foreign Application Priority Data
Sep. 26, 2017    (CN) .......................... 201710880316.8

(51) Int. Cl.
*H04L 9/08*    (2006.01)
*G06F 21/78*    (2013.01)
(Continued)

(52) U.S. Cl.
CPC .......... *G06F 21/78* (2013.01); *G06F 11/1451* (2013.01); *G06F 11/1464* (2013.01);
(Continued)

(58) Field of Classification Search
CPC ........ G06F 21/78; G06F 21/60; G06F 21/602; G06F 21/62; G06F 21/6218; G06F 11/14;
(Continued)

(56) References Cited

U.S. PATENT DOCUMENTS

2010/0031063 A1*  2/2010 Fascenda ............ G06F 11/1458
                                                            713/193
2014/0331050 A1   11/2014 Armstrong et al.
(Continued)

FOREIGN PATENT DOCUMENTS

| CN | 105245329 A | 1/2016 |
| CN | 106161402 A | 11/2016 |

(Continued)

OTHER PUBLICATIONS

International Search Report and Written Opinion of the International Searching Authority for International Patent Application No. PCT/CN2018/096702 dated Oct. 15, 2018, 8 pages.
(Continued)

*Primary Examiner* — Shaqueal D Wade-Wright
(74) *Attorney, Agent, or Firm* — Merchant & Gould P.C.

(57) ABSTRACT

An encrypted data storage system and method based on offsite key storage are provided, comprising the system includes a key control center, an offsite key storage system, and a data encryption/decryption storage system. The offsite key storage system includes a first key control device, a key storage device, and a first quantum key distribution device. The data encryption/decryption storage system includes a second key control device, a data encryption/decryption storage device, and a second quantum key distribution
(Continued)

device. The first quantum key distribution device is in quantum communication connection with the second quantum key distribution device. The first key control device is communicatively connected with the key storage device and the first quantum key distribution device, respectively.

10 Claims, 9 Drawing Sheets

(51) Int. Cl.
*G06F 11/14* (2006.01)
*G06F 21/60* (2013.01)
*G06F 21/62* (2013.01)
*H04L 9/40* (2022.01)

(52) U.S. Cl.
CPC ........ *G06F 11/1469* (2013.01); *G06F 21/602* (2013.01); *G06F 21/6218* (2013.01); *H04L 9/0819* (2013.01); *H04L 9/0822* (2013.01); *H04L 9/0852* (2013.01); *H04L 9/0894* (2013.01); *H04L 63/0428* (2013.01); *H04L 63/062* (2013.01)

(58) Field of Classification Search
CPC ............. G06F 11/1451; G06F 11/1464; G06F 11/1469; H04L 9/08; H04L 9/0819; H04L 9/0852; H04L 9/0855; H04L 9/0894; H04L 63/04; H04L 63/0428; H04L 63/062; H04L 63/06
See application file for complete search history.

(56) References Cited

U.S. PATENT DOCUMENTS

| | | | |
|---|---|---|---|
| 2016/0226598 A1* | 8/2016 | Zhao | H04B 10/70 |
| 2016/0226846 A1* | 8/2016 | Fu | H04L 63/062 |
| 2016/0321461 A1 | 11/2016 | Oliver et al. | |
| 2017/0222803 A1* | 8/2017 | Tanizawa | H04L 63/0853 |
| 2017/0324550 A1* | 11/2017 | Yuan | H04L 9/0822 |

FOREIGN PATENT DOCUMENTS

| | | |
|---|---|---|
| CN | 106209739 A | 12/2016 |
| CN | 106789052 A | 5/2017 |
| CN | 106941403 A | 7/2017 |
| CN | 106953729 A | 7/2017 |
| CN | 106961330 A | 7/2017 |
| EP | 3 293 934 A1 | 3/2018 |
| JP | 2007-267069 A | 10/2007 |
| WO | 2016/177332 A1 | 11/2016 |

OTHER PUBLICATIONS

First Office Action for Chinese Patent Application No. 201710880316.8 dated Oct. 29, 2020, 16 pages.
Extended European Search Report for European Patent Application No. 18861213.9 dated May 19, 2021, 9 pages.
Office Action for Japanese Patent Application No. 2020-518668 dated Jun. 1, 2021, 9 pages.
"Use Cases", ETSI Draft; 00002_USERREQSV001, European Telecommunications Standards Institute (ETSI), 650, Rout Des Lucioles; F-06921 Sophia-Antipolis; France, 1-40 (Oct. 2009).

* cited by examiner

ENCRYPTED DATA STORAGE SYSTEM AND METHOD BASED ON OFFSITE KEY STORAGE

This application is a National Stage Application of PCT/CN2018/096702, filed 23 Jul. 2018, which claims benefit of Serial No. 201710880316.8, filed 26 Sep. 2017 in China and which applications are incorporated herein by reference. To the extent appropriate, a claim of priority is made to each of the above disclosed applications.

TECHNICAL FIELD

The present disclosure relates to the field of information transmission and storage and information security, and in particular, to an encrypted data storage system and method based on offsite key storage.

BACKGROUND

Information is an important strategic resource for social development. Everything from national security to personal privacy protection is related to information security. Driven by digital technology, the storage and flow transmission of information after it is converted into data are two important links in the process of information circulation and usage. In these two links, safety of information and data is threatened by eavesdropping and theft. Therefore, how to protect information data security is an eternally important topic.

In the field of data storage, with the accumulation of current data volume and the large-scale expansion of data applications, in addition to personal computers, servers and storage centers of enterprises and institutions, the number and scale of big data storage and computing centers, cloud storage and cloud computing centers in various locations are showing explosive growth. The emergence of these centers has greatly reduced the cost of data services, and made it easier and faster to provide data services, pushing data storage into the daily lives of the general public. Currently, there are two ways for data storage, namely, plaintext storage and encrypted data storage. The most commonly used data storage method is plaintext storage. This storage method is convenient and fast, but the data is public. The problem of data leakage and theft has increased dramatically and has become a serious social problem. In particular, some important data, such as national geographic surveying and mapping information, is under extreme risk of leakage and theft. Once leaked, the losses are not only huge, but even irreparable. Strict security management and control technologies for data storage are adopted to reduce security risks and improve data security. Currently, two technologies are used, one is to strengthen the security protection of the system, and the other is to encrypt the data into ciphertext for storage. Regarding to data encryption storage, even if the stored data content is stolen, as long as the key is not stolen, the stealer cannot understand the ciphertext, therefore, the information itself is safe. However, these two technologies only increase the difficulty of invading the system and increase the difficulty of cracking the data. Especially in complex and large data storage systems or in vulnerable storage systems, the data may still be stolen and cracked. In addition, these two technologies bring inconveniences in data backup, disaster recovery, multi-active and other applications. Therefore, the security of data is still not well guaranteed.

Currently, for the normal use of legitimate users, the encryption/decryption keys for encrypted storage data have to be stored in a database, at least in the same security zone. Such a key storage method is capable of preventing the key from being stolen during transmission, thereby preventing information leakage. However, since the data storage and database must be connected to external user terminals, in principle, any externally connected terminal may steal the key by using stealing means such as Trojans, which brings significant risks to data security.

In principle, the best security can only be achieved if the encryption/decryption keys are stored separately from the ciphertext, and the keys are stored in a strictly secured location. However, the current database encryption only adopts password technologies. There are two types of password technologies. One type is based on symmetric keys, but the problem of secure transmission and distribution of symmetric keys has not been solved. The other type is a commonly used asymmetric cryptographic technology, which is based on mathematical problems. This key system can publicly distribute keys in principle, but its security has not been proven, and it faces the risk of attack from supercomputers and quantum computers. In particular, it cannot resist the attack from quantum computers.

SUMMARY

The technical problem to be solved by the present disclosure is to provide an encrypted data storage system and method based on the offsite key storage in view of the shortcomings of the prior art. The encrypted data storage system and method based on offsite key storage solves the problem of how to separately store the encryption key and ciphertext securely, which cannot be solved by the existing technology. The present disclosure is capable of solving the problems of secure and offsite storage of keys and encryption/decryption and storage of ciphertext in structured and unstructured data storage, database storage, data backup, cloud storage and cloud computing. Because the number of encrypted keys may be many times smaller than the stored data, it is much less difficult to store and manage the key store (key storage device) than strictly managing the data, so it may effectively solve the security issues in the storage and computing process of various kinds of structured and unstructured data storage and database, cloud storage and cloud computing.

To achieve the above technical objectives, a technical solution adopted by the present disclosure is:

An encrypted data storage system based on offsite key storage, including: a key control center, a offsite key storage system, and a data encryption/decryption storage system, the offsite key storage system including a first key control device, a key storage device, and a first quantum key distribution device, the data encryption/decryption storage system including a second key control device, a data encryption/decryption storage device, and a second quantum key distribution device;

Wherein the key control center is communicatively connected with the first key control device, the key control center is communicatively connected with the second key control device, the first quantum key distribution device is in quantum communication connection with the second quantum key distribution device, the first key control device is communicatively connected with the key storage device and the first quantum key distribution device, respectively, the key storage device is communicatively connected with the first quantum key distribution device, the second key control device is communicatively connected with the data encryption/decryption storage device and the second quantum key distribution device, respectively, the data encryption/decryption storage device and the second quantum key distribution device is communicatively connected.

As a further improved technical solution of the present disclosure, the data encryption/decryption storage system further includes a ciphertext storage device. The ciphertext storage device is communicatively connected with the data encryption/decryption storage device. The data encryption and decryption storage device includes an input end and an output end. The input end of the data encryption/decryption storage device is used for inputting data, and the output end of the data encryption/decryption storage device is used for outputting data that has been encrypted or decrypted by the device.

As a further improved technical solution of the present disclosure, both the first quantum key distribution device and the second quantum key distribution device use a quantum key distribution terminal.

As a further improved technical solution of the present disclosure, the offsite key storage system and the data encryption/decryption storage system both are individual or multiple. The individual or multiple offsite key storage systems are communicatively connected with the key control center. The individual or multiple offsite key storage systems and the individual or multiple data encryption/decryption storage systems are offsite storage and the offsite storage refers to spatially separated storage.

As a further improved technical solution of the present disclosure, the disclosure further includes a first optical quantum switching device and a second optical quantum switching device. Each of the first quantum key distribution devices in the individual or multiple offsite key storage systems is connected to the first optical quantum switching device through an optical fiber. Each of the second quantum key distribution devices in the individual or multiple data encryption/decryption storage systems is connected to the second optical quantum switching device through an optical fiber. The first optical quantum switching device is connected to the second optical quantum switching device via a fiber through quantum communication.

As a further improved technical solution of the present disclosure, the disclosure further includes a first optical quantum wavelength division multiplexing device and a second optical quantum wave division multiplexing device. Each of the first quantum key distribution devices in the individual or multiple offsite key storage systems is connected to the first optical quantum wavelength division multiplexing device through an optical fiber. Each of the second quantum key distribution devices in the individual or multiple data encryption/decryption storage systems is connected to the second optical quantum wavelength division multiplexing device through an optical fiber. The first optical quantum wavelength division multiplexing device is connected to the second optical quantum wavelength division multiplexing device via a fiber through quantum communication.

As a further improved technical solution of the present disclosure, the present disclosure further includes a ciphertext backup storage system, which comprises a backup ciphertext storage device. The ciphertext storage device is communicatively connected with the backup ciphertext storage device in the ciphertext backup storage system. The backup ciphertext storage device in the ciphertext backup storage system and the ciphertext storage device are offsite storage. The ciphertext storage device and the key storage device in the offsite key storage system are offsite storage, and the offsite storage refers to spatially separated storage.

As a further improved technical solution of the present disclosure, the present disclosure further includes a key offsite backup storage system. The key offsite backup storage system includes a key backup storage device. The key backup storage device is communicatively connected with the key storage device. The key backup storage device and the key storage device are offsite storage, and the offsite storage refers to spatially separated storage.

To achieve the above technical objectives, another technical solution adopted by the present disclosure is:

A encrypted data storage method based on offsite key storage, the method including: adopting quantum key distribution technology, by both a key storage system and a data encryption/decryption storage system, to realize data encryption storage.

As a further improved technical solution of the present disclosure, adopting quantum key distribution technology to realize data encryption storage specifically includes the following steps, wherein Step 1: a data encryption/decryption storage device feeds back an encryption request to a second key control device according to input data, and the second key control device feeds back the encryption request to a key control center;

Step 2: the key control center receives the encryption request fed back by the second key control device, after the encryption request is authorized by the key control center, the key control center sends control information to a first key control device and the second key control device;

Step 3: the first key control device sends control information to a first quantum key distribution device, and the second key control device sends control information to a second quantum key distribution device;

Step 4: the first quantum key distribution device and the second quantum key distribution device generate a pair of identical quantum keys through quantum communication, and two quantum keys comprised in the pair of identical quantum keys are referred to as a first quantum key and a second quantum key, respectively, the first quantum key distribution device sends the generated first quantum key to a key storage device, and the second quantum key distribution device sends the generated second quantum key to the data encryption/decryption storage device;

Step 5: the key storage device stores the first quantum key and marks the first quantum key as $T_k$, the data encryption/decryption storage device encrypts the input data through the second quantum key to obtain ciphertext, the data encryption/decryption storage device marks the ciphertext as $T_d$ and outputs it to a ciphertext storage device;

Step 6: the key storage device feeds back a result that the first quantum key is marked as $T_k$ to the key control center through the first key control device, the data encryption/decryption storage device feeds back a result that the ciphertext is marked as $T_d$ to the key control center through the second key control device.

As a further improved technical solution of the present disclosure, adopting quantum key distribution technology to realize data encryption storage further includes the following steps, wherein Step 1: the data encryption/decryption storage device feeds back a decryption request to the second key control device according to the mark $T_d$ of input ciphertext, and the second key control device feeds back the decryption request to the key control center;

Step 2: the key control center receives the decryption request of the ciphertext marked as $T_d$, after the decryption request is authorized by the key control center, the key control center sends control information to the first key control device and the second key control device;

Step 3: the first key control device sends control information to the first quantum key distribution device, the first key control device fetches the first quantum key marked as $T_k$ from the key storage device based on the mark $T_d$ of the ciphertext, and the first key control device uses the first quantum key marked as $T_k$ as a decryption key for the decryption request;

Step 4: the second key control device sends control information to the second quantum key distribution device;

Step 5: the first quantum key distribution device and the second quantum key distribution device generate a pair of identical quantum keys through quantum communication, and two quantum keys comprised in the pair of identical quantum keys are referred to as a third quantum key and a fourth quantum key, respectively, the first quantum key distribution device sends the generated third quantum key to the first key control device, and the second quantum key distribution device sends the generated fourth quantum key to the second key control device;

Step 6: the first key control device performs encryption processing on the third quantum key and the decryption key to form a ciphertext, and the first key control device sends the ciphertext to the second key control device;

Step 7: the second key control device performs decryption processing on the ciphertext according to the fourth quantum key same as the third quantum key to decrypt the decryption key, and the second key control device sends the decryption key to the data encryption/decryption storage device;

Step 8: the data encryption/decryption storage device performs decryption processing on the input ciphertext marked as $T_d$ according to the decryption key and outputs the decrypted data;

Step 9: the data encryption/decryption storage device feeds back a decryption result to the key control center through the second key control device.

The beneficial effects of the present disclosure are:

1. Since the present disclosure sets the key storage device and the data encryption/decryption storage device in different systems, the present disclosure is capable of securely and reliably setting the offsite key storage system and the data encryption/decryption storage system separately at any distance through quantum technology, so that encryption/decryption keys are stored separately from data. Even if the data content stored in one location is stolen, as long as the key in another location is not stolen, the stealer cannot understand the ciphertext, so the information itself is safe. In this way, it can prevent the situation that data and encryption/encryption keys stored in the same location are easily stolen at the same time, guarantee security unconditionally during the transmission of encryption/decryption keys, and improve data storage security, which cannot be achieved by traditional cryptographic technology.

2. The present disclosure may be widely applied to the encryption protection technology of structured databases, unstructured databases, cloud security, and disaster recovery data, and solves the data security issues existing in database storage, access, cloud storage and computing, disaster recovery and data transmission, thereby increasing the level of data security protection.

3. The key storage terminal (key storage device) of the present disclosure is small in size and low in power consumption, convenient to set a higher level of security protection, and accordingly increases the security level of data storage.

4. The key storage terminal (key storage device) and the data storage terminal (data encryption/decryption storage system) referred to in the present disclosure are stored in different locations, and the distance may be controlled arbitrarily, which comprehensively improves the security of data storage, eases disaster prevention, and reduces the cost of data security protection.

5. According to an optimization scheme of the present disclosure, after the data content is accessed or changed, a new key is used to replace the old key, and the data is re-encrypted and stored. The encryption key update mechanism further increases the security of data storage.

DETAILED DESCRIPTION

The following specifically describes the specific embodiments of the present disclosure based on FIG. 1 to FIG. 10. It should be clear that the described embodiments are only a part of the embodiments of the present disclosure, but not all the embodiments. All other embodiments obtained by those skilled in the art based on the embodiments of the present disclosure without creative work should fall within the protection scope of the present disclosure.

Figure 1:
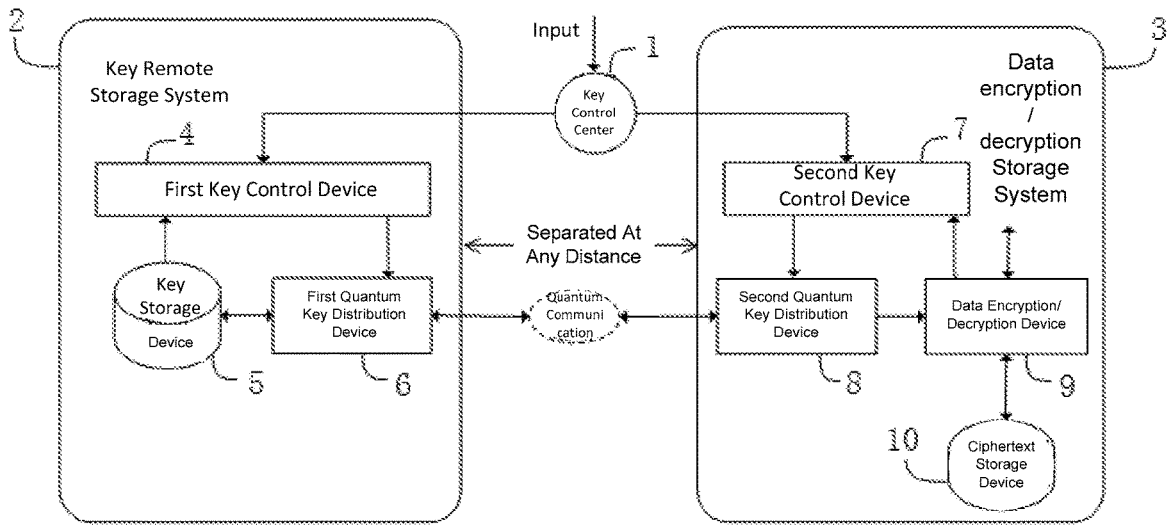
FIG. 1 is a schematic structural diagram of the present disclosure.

Referring to FIG. 1, the present disclosure provides an encrypted data storage system based on offsite key storage, which includes a key control center 1, a offsite key storage system 2, and a data encryption/decryption storage system 3.

The key control center 1 includes management and security control decision information input. The offsite key storage system 2 includes a first key control device 4, a key storage device 5, and a first quantum key distribution device 6. The data encryption/decryption storage system 3 includes a second key control device 7, a data encryption/decryption storage device 9, and a second quantum key distribution device 8. The key control center 1 is communicatively connected with the first key control device 4. The key control center 1 is communicatively connected with the second key control device 7. The first quantum key distribution device 6 is in quantum communication connection with the second quantum key distribution device 8. The first key control device 4 is communicatively connected with the key storage device 5 and the first quantum key distribution device 6, respectively. The key storage device 5 is communicatively connected with the first quantum key distribution device 6. The second key control device 7 is communicatively connected with the data encryption/decryption storage device 9 and the second quantum key distribution device 8, respectively. The data encryption/decryption storage device 9 and the second quantum key distribution device 8 are communicatively connected. The physical distance between the offsite key storage system 2 and the data encryption/decryption storage system 3 may be set to any distance.

The data encryption/decryption storage system 3 further includes a ciphertext storage device 10. The ciphertext storage device 10 is communicatively connected with the data encryption/decryption storage device 9. The data encryption/decryption storage device 9 includes an input end and an output end. The input end of the data encryption/decryption storage device 9 is used for inputting data, and the output end of the data encryption/decryption storage device 9 is used for outputting data by which has been encrypted or decrypted.

Both the first quantum key distribution device 6 and the second quantum key distribution device 8 use a quantum key distribution terminal (QKD).

The offsite key storage system 2 and the data encryption/decryption storage system 3 may be both individual or multiple. The individual or multiple offsite key storage systems 2 are communicatively connected with the key control center 1. The individual or multiple offsite key storage systems 2 and the individual or multiple data encryption/decryption storage systems 3 are offsite storage.

The disclosure also includes a first optical quantum switching device and a second optical quantum switching device. Each of the first quantum key distribution devices 6 in the individual or multiple offsite key storage systems 2 is connected to the first optical quantum switching device through an optical fiber. Each of the second quantum key distribution devices 8 in the individual or multiple data encryption/decryption storage systems 3 is connected to the second optical quantum switching device through an optical fiber. The first optical quantum switching device is connected to the second optical quantum switching device via a fiber through quantum communication.

The disclosure also includes a first optical quantum wavelength division multiplexing device and a second optical quantum wavelength division multiplexing device. Each of the first quantum key distribution devices 6 in the individual or multiple offsite key storage systems 2 is connected to the first optical quantum wavelength division multiplexing device through an optical fiber. Each of the second quantum key distribution devices 8 in the individual or multiple data encryption/decryption storage systems 3 is connected to the second optical quantum wavelength division multiplexing device through an optical fiber. The first optical quantum wavelength division multiplexing device is connected to the second optical quantum wavelength division multiplexing device via a fiber through quantum communication.

The present disclosure further includes a ciphertext backup storage system 17, which includes a backup ciphertext storage device 18. The ciphertext storage device 10 is communicatively connected with the backup ciphertext storage device 18 in the ciphertext backup storage system 17. The backup ciphertext storage device 18 in the ciphertext backup storage system 17 and the ciphertext storage device 10 are offsite storage. The ciphertext storage device 10 and the key storage device 5 in the offsite key storage system 2 are offsite storage. The offsite storage means that each storage device is spatially separated and stored.

The present disclosure further includes a key offsite backup storage system 27. The key offsite backup storage system 27 includes a key backup storage device. The key backup storage device is communicatively connected with the key storage device 5. The key backup storage device and the key storage device 5 are stored in different locations.

A encrypted data storage method based on offsite key storage, the method includes: adopting quantum key distribution technology, by both a key storage system and a data encryption/decryption storage system, to realize data encryption storage.

The adopting quantum key distribution technology to realize data encryption storage specifically includes an encryption step and a decryption step. Both the encryption step and the decryption step of the system may be initiated by any device, which includes the key control center, any offsite key storage system and data encryption/decryption storage system. The typical working steps of the first type are as follows. The encryption step includes the following steps:

Step 1: The data encryption/decryption storage device 9 feeds back the encryption request to the second key control device 7 according to the input data, and the second key control device 7 feeds back the encryption request to the key control center 1;

Step 2: The key control center 1 receives the encryption request fed back by the second key control device 7. After the encryption request is authorized by the key control center 1, the key control center 1 sends control information to the first key control device 4 and the second key control device 7;

Step 3: The first key control device 4 sends control information to the first quantum key distribution device 6, and the second key control device 7 sends control information to the second quantum key distribution device 8;

Step 4: The first quantum key distribution device 6 and the second quantum key distribution device 8 generate a pair of identical quantum keys through quantum communication, and the pair of identical quantum keys are called the first quantum key and the second quantum key, respectively. The first quantum key distribution device 6 sends the generated first quantum key to the key storage device 5, and the second quantum key distribution device 8 sends the generated second quantum key to the data encryption/decryption storage device 9;

Step 5: The key storage device 5 stores the first quantum key and marks the first quantum key as $T_k$. The data encryption/decryption storage device 9 encrypts the input data through the second quantum key to obtain ciphertext. The data encryption/decryption storage device 9 marks the ciphertext as $T_d$ and outputs it to the ciphertext storage device 10;

Step 6: The key storage device 5 feeds back the result that the first quantum key is marked as $T_k$ to the key control center 1 through the first key control device 4. The data encryption/decryption storage device 9 feeds back the result that the ciphertext is marked as $T_d$ to the key control center 1 through the second key control device 7. The key control center 1 marks the encryption request processing result.

The decryption step includes the following steps:

Step 1: The data encryption/decryption storage device 9 feeds back the decryption request to the second key control device 7 according to the mark $T_d$ of input ciphertext, and the second key control device 7 feeds back the decryption request to the key control center 1;

Step 2: The key control center 1 receives the decryption request of the ciphertext marked as $T_d$. After the decryption request is authorized by the key control center 1, the key control center 1 sends control information to the first key control device 4 and the second key control device 7;

Step 3: The first key control device 4 sends control information to the first quantum key distribution device 6. The first key control device 4 fetches the first quantum key marked as $T_k$ from the key storage device 5 based on the mark $T_d$ of the ciphertext, and the first key control device 4 uses the first quantum key marked as $T_k$ as a decryption key for the decryption request;

Step 4: The second key control device 7 sends control information to the second quantum key distribution device 8;

Step 5: The first quantum key distribution device 6 and the second quantum key distribution device 8 generate a pair of identical quantum keys through quantum communication, and the two quantum keys included in the pair of identical quantum keys are called the third quantum key and the fourth quantum key, respectively. The first quantum key distribution device 6 sends the generated third quantum key to the first key control device 4, and the second quantum key distribution device 8 sends the generated fourth quantum key to the second key control device 7;

Step 6: the first key control device 4 performs one-time pad encryption processing on the third quantum key and the decryption key to form a ciphertext, and the first key control device 4 sends the ciphertext to the second key control device 7;

Step 7: The second key control device 7 performs one-time pad decryption processing on the ciphertext according to the fourth quantum key same as the third quantum key to decrypt the decryption key, and the second key control device 7 sends the decryption key to the data encryption/decryption storage device 9;

Step 8: The data encryption/decryption storage device 9 performs decryption processing on the input ciphertext marked as $T_d$ according to the decryption key and outputs the decrypted data;

Step 9: The data encryption/decryption storage device 9 feeds back the decryption result to the key control center 1 through the second key control device 7, and the key control center 1 marks the decryption request processing result.

In addition, the typical working steps of the second type are as follows. The encryption step includes the following steps:

Step 1: The key control center 1 receives the encryption request. After the encryption request is authorized by the key control center 1, the key control center 1 sends control information to the first key control device 4 and the second key control device 7;

Step 2: The first key control device 4 sends control information to the first quantum key distribution device 6, and the second key control device 7 sends control information to the second quantum key distribution device 8;

Step 3: The first quantum key distribution device 6 and the second quantum key distribution device 8 generate a pair of identical quantum keys through quantum communication, and the two quantum keys included in the pair of identical quantum keys are called the first quantum key and the second quantum key, respectively. The first quantum key distribution device 6 sends the generated first quantum key to the key storage device 5, and the second quantum key distribution device 8 sends the generated second quantum key to the data encryption/decryption storage device 9;

Step 5: The key storage device 5 stores the first quantum key and marks the first quantum key as $T_k$. The data encryption/decryption storage device 9 encrypts the input data through the second quantum key to obtain ciphertext.

The data encryption/decryption storage device 9 marks the ciphertext as $T_d$ and outputs it to the ciphertext storage device 10;

Step 6: The key storage device 5 feeds back the result that the first quantum key is marked as $T_k$ to the key control center 1 through the first key control device 4. The data encryption/decryption storage device 9 feeds back the result that the ciphertext is marked as $T_d$ to the key control center 1 through the second key control device 7.

The decryption step includes the following steps:

Step 1: The key control center 1 receives the decryption request of the ciphertext marked as $T_d$. After the decryption request is authorized by the key control center 1, the key control center 1 sends control information to the first key control device 4 and the second key control device 7;

Step 2: The first key control device 4 sends control information to the first quantum key distribution device 6. The first key control device 4 fetches the first quantum key marked as $T_k$ from the key storage device 5 based on the mark $T_d$ of the ciphertext, and the first key control device 4 uses the first quantum key marked as $T_k$ as a decryption key for the decryption request;

Step 3: The second key control device 7 sends control information to the second quantum key distribution device 8;

Step 4: The first quantum key distribution device 6 and the second quantum key distribution device 8 generate a pair of identical quantum keys through quantum communication, and the two quantum keys included in the pair of identical quantum keys are called the third quantum key and the fourth quantum key, respectively. The first quantum key distribution device 6 sends the generated third quantum key to the first key control device 4, and the second quantum key distribution device 8 sends the generated fourth quantum key to the second key control device 7;

Step 5: the first key control device 4 performs (one-time pad) encryption processing on the third quantum key and the decryption key to form a ciphertext, and the first key control device 4 sends the ciphertext to the second key control device 7;

Step 6: The second key control device 7 performs (one-time pad) decryption processing on the ciphertext according to the fourth quantum key same as the third quantum key to decrypt the decryption key, and the second key control device 7 sends the decryption key to the data encryption/decryption storage device 9;

Step 7: The data encryption/decryption storage device 9 performs decryption processing on the input ciphertext marked as $T_d$ according to the decryption key and outputs the decrypted data;

Step 8: The data encryption/decryption storage device 9 feeds back the decryption result to the key control center 1 through the second key control device 7.

The following specifically applies the above-mentioned encrypted data storage system based on offsite key storage to specific applications according to eight embodiments.

Embodiment 1

Figure 2:
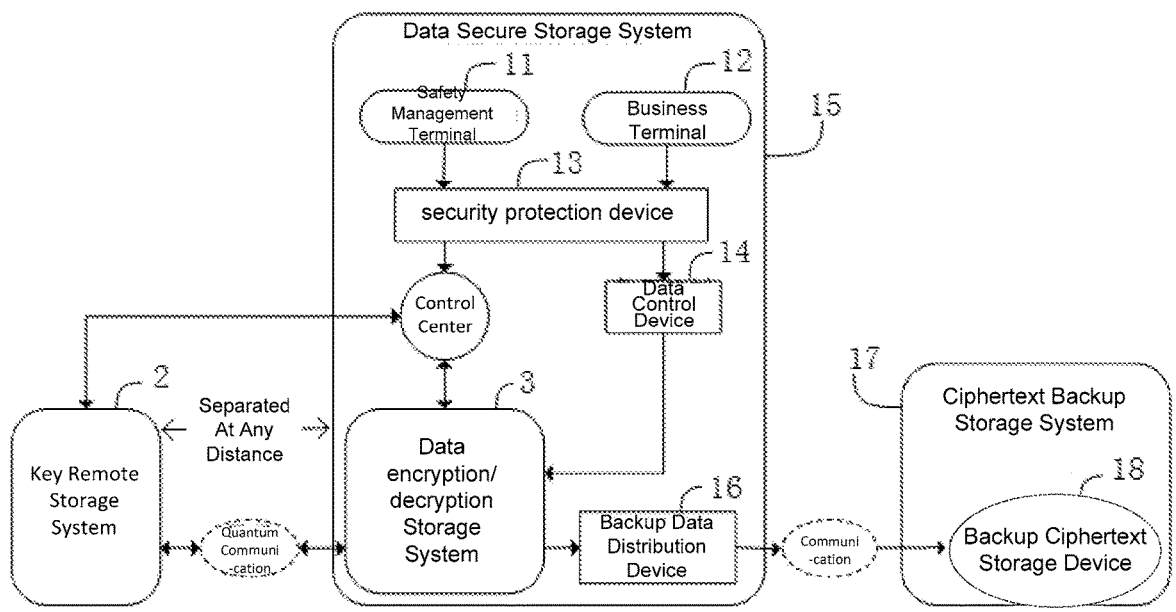
FIG. 2 is a schematic structural diagram of the first embodiment of the present disclosure.

Referring to FIG. 2, FIG. 2 only illustrates a basic structure of the offsite key storage system 2 and the data encryption/decryption storage system 3 in a database system application, that is, illustrating a basic security principle of establishing a database encrypted storage and access, and a database security backup. The combination of the encrypted data storage system based on the offsite key storage and the various security control devices in the database system has been completed to improve the security of the data. The specific structure is described below.

The encrypted data storage system based on offsite key storage is deployed in a database application system. A database application system refers to a structured database application system, or an unstructured database application system, or a cloud storage application system. The entire system structure includes a control center, a offsite key storage system 2, a data encryption/decryption storage system 3, a data secure storage system 15, and a ciphertext backup storage system 17.

The control center includes a key control center 1 and a database control center. The data secure storage system 15 includes a security management terminal 11, a business terminal 12, a security protection device 13, a data control device 14, a ciphertext storage device 10 (where the ciphertext storage device 10 may also be provided in the data encryption/decryption storage system 3), and a backup data distribution device 16. The key control center 1 is communicatively connected with the offsite key storage system 2, the data encryption/decryption storage system 3, and the security protection device 13, respectively. The security protection device 13 is communicatively connected with the security management terminal 11, the business terminal 12, and the data encryption/decryption storage system 3. The data encryption/decryption storage device 9 in the data encryption/decryption storage system 3 is communicatively connected with the ciphertext storage device 10.

The security management terminal 11 refers to the platform for unified management and control of a database, including a database management system. The business terminal 12 refers to the platform provided to business personnel for business processing, including business processing systems and data business intelligent terminals. The security protection device 13 refers to the security protection method and device, including a firewall device, an intrusion detection device, a virus protection device, a vulnerability scanning device, and a security audit device. The security protection device 13 uses the traditional security technology to improve the system security protection level. The ciphertext backup storage system 17 includes a backup ciphertext storage device 18. The backup ciphertext storage device 18 backs up the ciphertext, makes the data transmission process end-to-end secure, and provides an inexpensive backup method for data disaster recovery.

The key control center 1 controls the offsite key storage system 2 and the data encryption/decryption storage system 3 to operate. The specific encryption method and decryption method are the same as those of the structure shown in FIG. 1.

Embodiment 2

Figure 3:
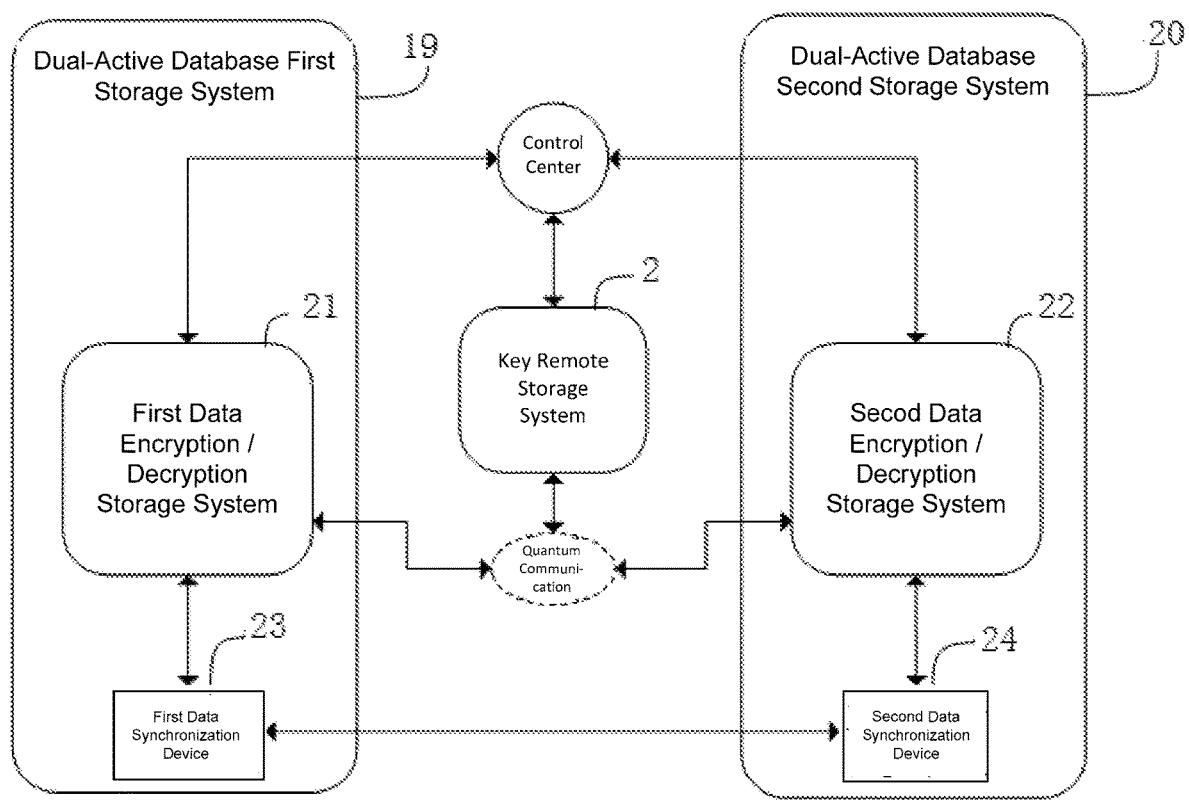
FIG. 3 is a schematic structural diagram of the second embodiment of the present disclosure.

Referring to FIG. 3, FIG. 3 only illustrates a basic structure and principle of an encrypted data storage system based on offsite key storage in a database dual-active application. The combination of the encrypted data storage system based on the offsite key storage and the encryption devices of the database dual-active system has been completed to significantly improve the security of the database dual-active system, and at the same time improve the high reliability guarantee of the dual-active database application. The specific structure is described below.

The encrypted data storage system based on offsite key storage is deployed in a database dual-active system. The database application system may be a dual-active or multi-active database system of a structured database application system, or an unstructured database application system, or a cloud storage application system. The system structure includes a control center, a offsite key storage system 2, a dual-active database first storage system 19, and a dual-active database second storage system 20.

The control center includes a key control center 1 and a dual-active database control center. The dual-active database first storage system 19 includes a first data encryption/decryption storage system 21 and a first data synchronization device 23. The dual-active database second storage system includes a second data encryption/decryption storage system 22 and a second data synchronization device 24. The first data encryption/decryption storage system 21 and the second data encryption/decryption storage system 22 are the same system. Further, the first data encryption/decryption storage system 21 and the second data encryption/decryption storage system 22 are the embodiment where the database shown in FIG. 3 is a dual-active database. When the database is implemented as a multi-active database, the data encryption/decryption storage system 3 may also be multiple. The first data synchronization device 23 and the second data synchronization device 24 are the same system.

The key control center 1 in the control center is communicatively connected with the first data encryption/decryption storage system 21 in the dual-active database first storage system 19, the second data encryption/decryption storage system 22 in the dual-active database second storage system 20, and the offsite key storage system 2, respectively. The offsite key storage system 2 connects to the first data encryption/decryption storage system 21 and the second data encryption/decryption storage system 22 through quantum communication. The first data synchronization device 23 and the second data synchronization device 24 are communicatively connected. The first data synchronization device 23 is communicatively connected with the ciphertext storage device 10 in the first data encryption/decryption storage system 21, and the second data synchronization device 24 is communicatively connected with the ciphertext storage system in the second data encryption/decryption storage system 22. The key control center 1 in the control center controls the first data encryption/decryption storage system 21, the second data encryption/decryption storage system 22, and the offsite key storage system 2 to operate. The specific encryption method and decryption method are the same as those in the structure shown in FIG. 1.

Embodiment 3

Figure 4:
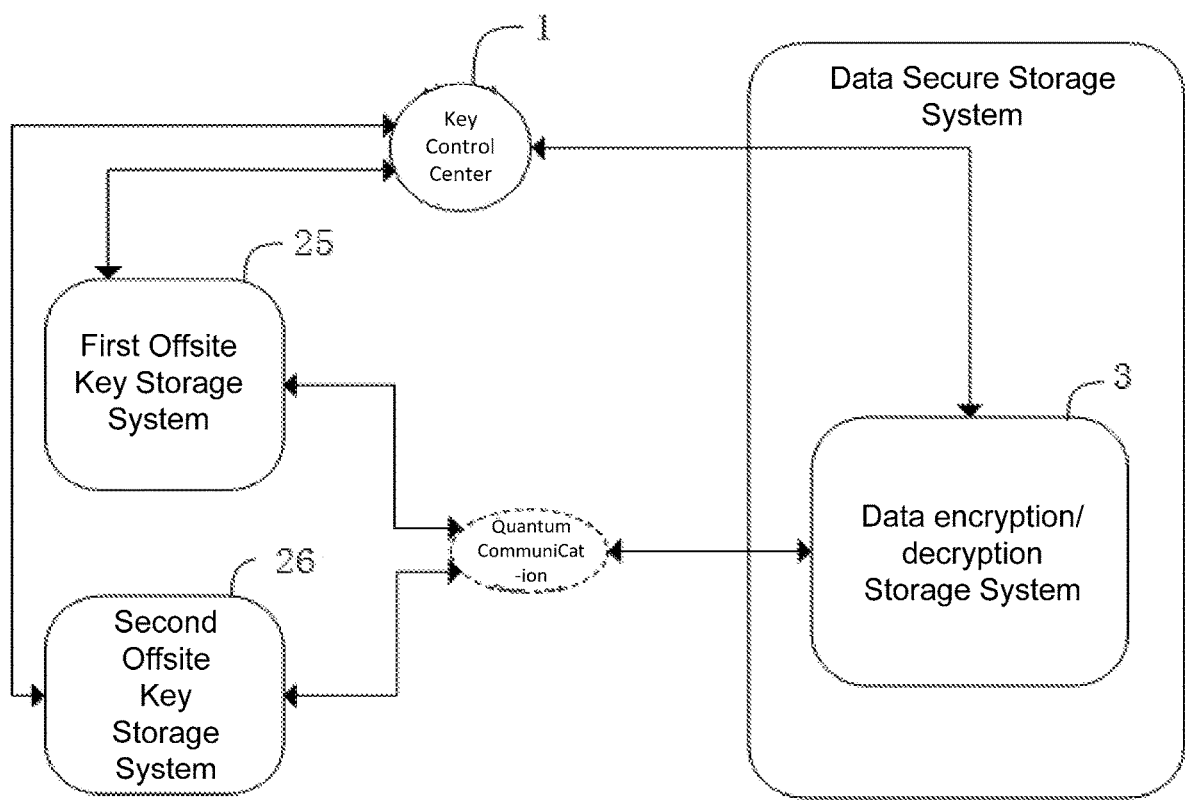
FIG. 4 is a schematic structural diagram of the third embodiment of the present disclosure.

Referring to FIG. 4, FIG. 4 only illustrates the basic structure and principle of the application of the dual-offsite key storage system 2 in the encrypted data storage system based on offsite key storage which realizes the offsite storage of keys in multiple locations, and improves the key storage efficiency and security guarantee. The dual-offsite key storage system 2 includes a key control center 1, a data secure storage system 15, a first offsite key storage system 25, and a second offsite key storage system 26; the data secure storage system 15 includes a data encryption/decryption storage system 3.

The key control center 1 controls the data encryption/decryption storage system 3, the first offsite key storage system 25, and the second offsite key storage system 26 to operate. The specific encryption method and decryption method are the same as those in the structure shown in FIG. 1. The difference is that when the encryption/decryption key request is made, the key control center 1 determines whether the key control center 1 interacts with the first offsite key storage system 25 or the second offsite key storage system 26 according to the key storage security policy, storage optimization policy and key mark $T_k$. Similarly, the offsite key storage system 2 may be expanded to multiple, further improving the multi-offsite key storage optimization.

Embodiment 4

Figure 5:
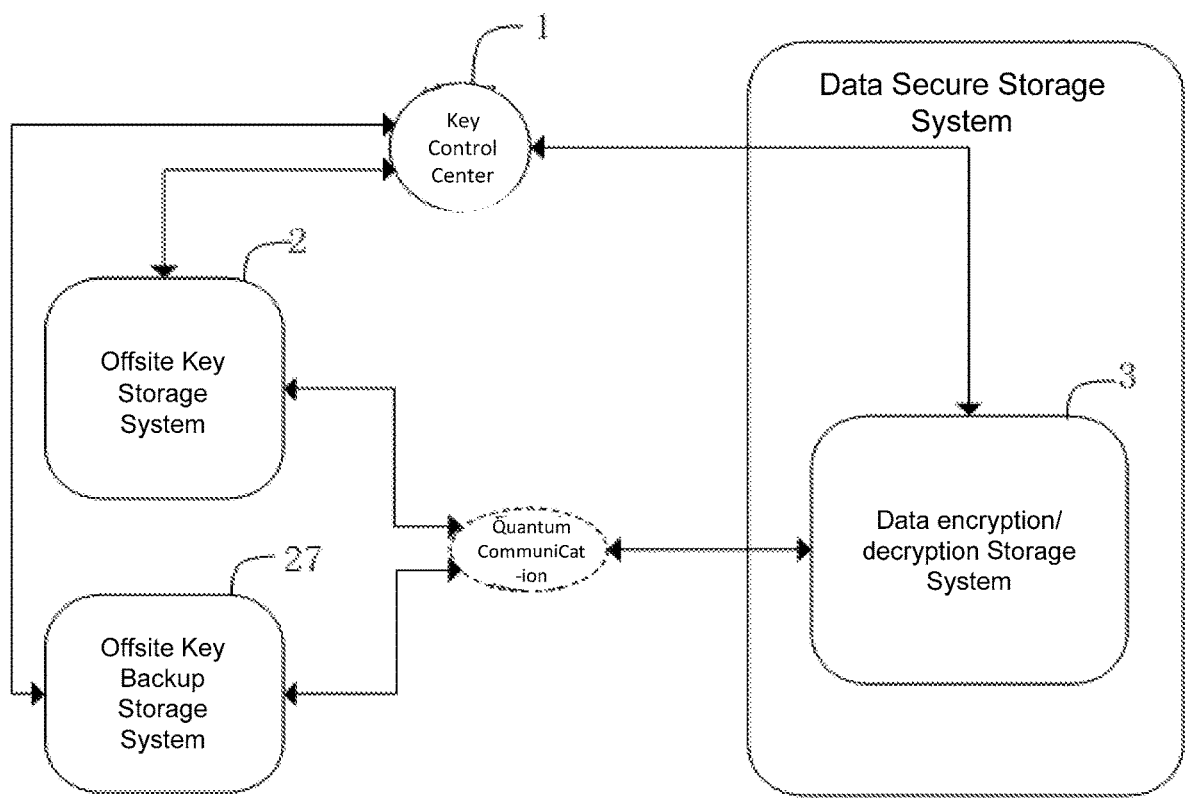
FIG. 5 is a schematic structural diagram of the fourth embodiment of the present disclosure.

Referring to FIG. 5, FIG. 5 only illustrates the basic structure and principle of the key offsite backup storage system 27 in the encrypted data storage system based on offsite key storage, which realizes offsite key storage and backup, and improves key storage reliability and robustness.

This embodiment includes a key control center 1, a offsite key storage system 2, a key offsite backup storage system 27, and a data encryption/decryption storage system 3. The key offsite backup storage system 27 has the same structure and device as the offsite key storage system 2. The key control center 1 controls the data encryption/decryption storage system 3, the offsite key storage system 2, and the key offsite backup storage system 27 to operate. The specific encryption method and decryption method are basically the same as those in the structure shown in FIG. 1. The difference is that when the encryption/decryption key request is made, the key control center 1 also sends control instruction to the key offsite backup storage system 27 according to the backup key storage security and optimization strategy. The first quantum key distribution device 6 in the offsite key storage system 2, the quantum key distribution device in the key offsite backup storage system 27, and the quantum key distribution device in the data encryption/decryption storage system 3 generate three identical quantum keys through quantum communication to complete the data encryption/decryption process. Similarly, the key offsite backup storage system 27 may be expanded to multiple, further improving the optimization of offsite storage of multiple backup keys.

Embodiment 5

Figure 6:
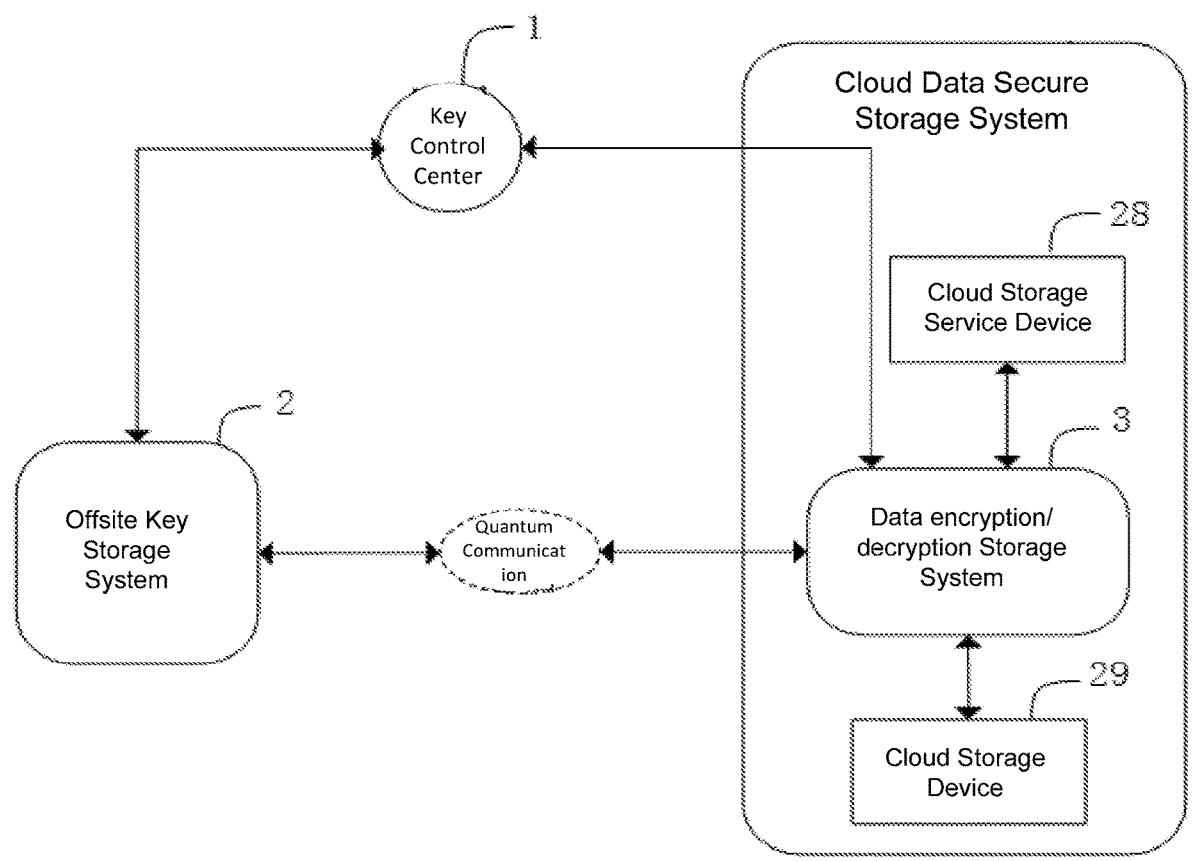
FIG. 6 is a schematic structural diagram of the fifth embodiment of the present disclosure.

Referring to FIG. 6, FIG. 6 only illustrates the basic structure and principle of the application of the data encryption/decryption storage device 9 based on offsite key storage in the cloud database secure storage system, realizing the cloud database secure storage.

The basic architecture includes a key control center 1, a offsite key storage system 2 and a cloud data secure storage system. The cloud data secure storage system includes a data encryption/decryption storage system 3, a cloud storage service device 28, and a cloud storage device 29. The cloud storage device 29 is communicatively connected with the data encryption/decryption storage device 9 in the data encryption/decryption storage system 3. The cloud storage service device 28 includes a cloud data decentralized system and a cloud data virtual storage view. The cloud storage service device 28 completes cloud service data processing. The cloud storage device 29 includes a cloud memory device to complete the underlying storage and management of data. The key control center 1 controls the data encryption/decryption storage system 3 and the offsite key storage system 2 to operate. The specific encryption method and decryption method are the same as those of the structure shown in FIG. 1. When the cloud storage service device 28 sends data to the data encryption/decryption storage device 9, by the encryption method and decryption method of the structure shown in FIG. 1, the ciphertext is finally sent to the cloud storage device 29 to complete the cloud data encryption and secure storage process.

Embodiment 6

Figure 7:
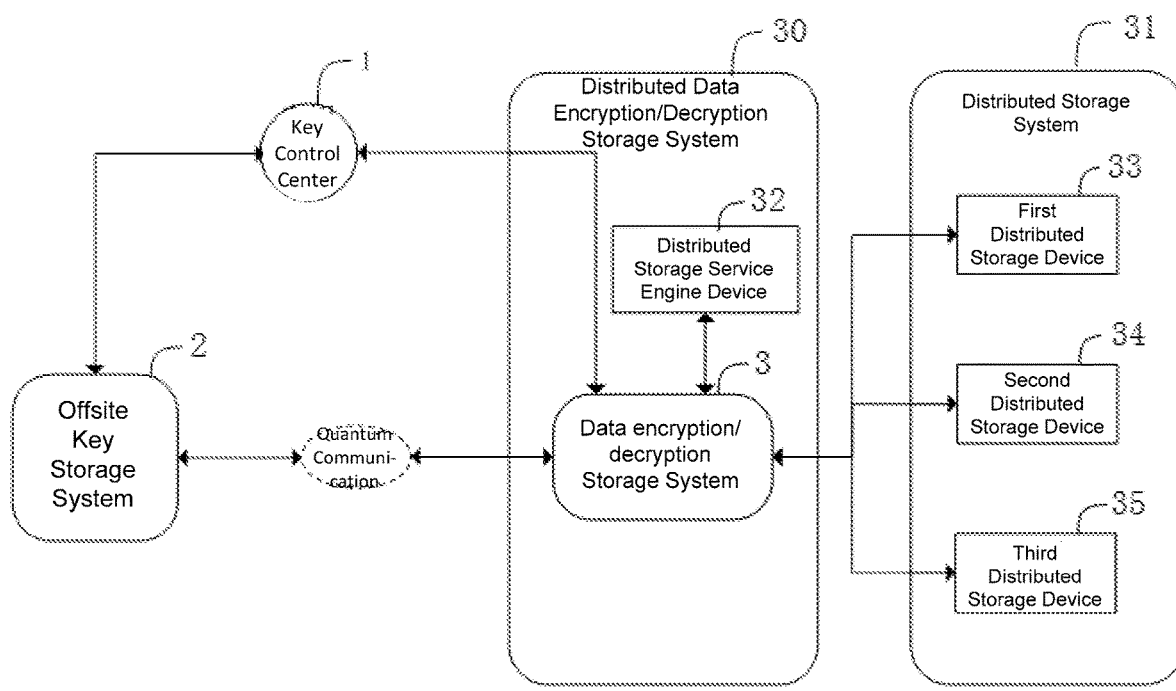
FIG. 7 is a schematic structural diagram of the sixth embodiment of the present disclosure.

Referring to FIG. 7, FIG. 7 only illustrates the basic structure and principle of the application of the encrypted data storage system based on offsite key storage in a distributed database secure storage system, realizing the distributed database secure storage.

The distributed database secure storage system includes a key control center 1, a offsite key storage system 2, a distributed data encryption/decryption storage system 30, and a distributed storage system 31. The distributed data encryption/decryption storage system 30 includes a data encryption/decryption storage system 3 and a distributed storage service engine device 32. The distributed storage service device 4 includes a first distributed storage device 33, a second distributed storage device 34, and a third distributed storage device 35. The distributed storage service engine device 32 is communicatively connected with the data encryption/decryption device in the data encryption/decryption storage system 3. The distributed storage system 31 is communicatively connected with the data encryption/decryption storage system 3. The distributed storage service engine device 32 includes a database analysis, execution, and optimization merge devices. The distributed storage system 31 includes one or more distributed storage devices. The key control center 1 controls the data encryption/decryption device in the data encryption/decryption storage system 3 and the offsite key storage system 2 to operate. The specific encryption method and decryption method are the same as those of the structure shown in FIG. 1. When the distributed storage service engine device 32 sends data to the data encryption/decryption storage system 3, by the encryption method and decryption method of the structure shown in FIG. 1, the ciphertext is finally sent to the distributed storage devices in the distributed storage system 31 to complete the distributed data encryption and secure storage process.

Embodiment 7

Figure 8:
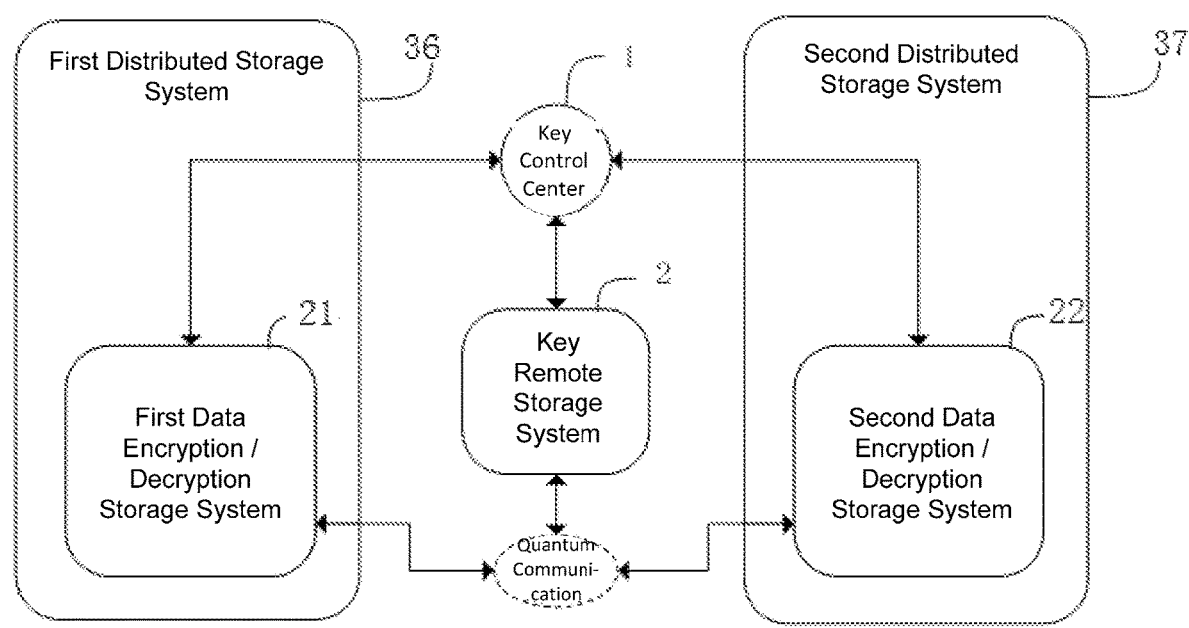
FIG. 8 is a schematic structural diagram of the seventh embodiment of the present disclosure.

Referring to FIG. 8, FIG. 8 only illustrates the basic structure and principle of another application of the encrypted data storage system based on offsite key storage in a distributed database secure storage system, realizing the distributed database secure storage.

The distributed database secure storage system includes a key control center 1, a offsite key storage system 2, a first distributed storage system 36, and a second distributed storage system 37. The first distributed storage system 36 includes a first data encryption/decryption storage system 21, and the second distributed storage system 37 includes a second data encryption/decryption storage system 22. The ciphertext storage devices in the first data encryption/decryption storage system 21 and the second data encryption/decryption storage system 22 are distributed storage devices.

The distributed database secure storage system may include three or more distributed storage systems. When each distributed storage system performs data storage or reading, the specific encryption method and decryption method are the same with those of the structure in FIG. 1.

Embodiment 8

Figure 9:
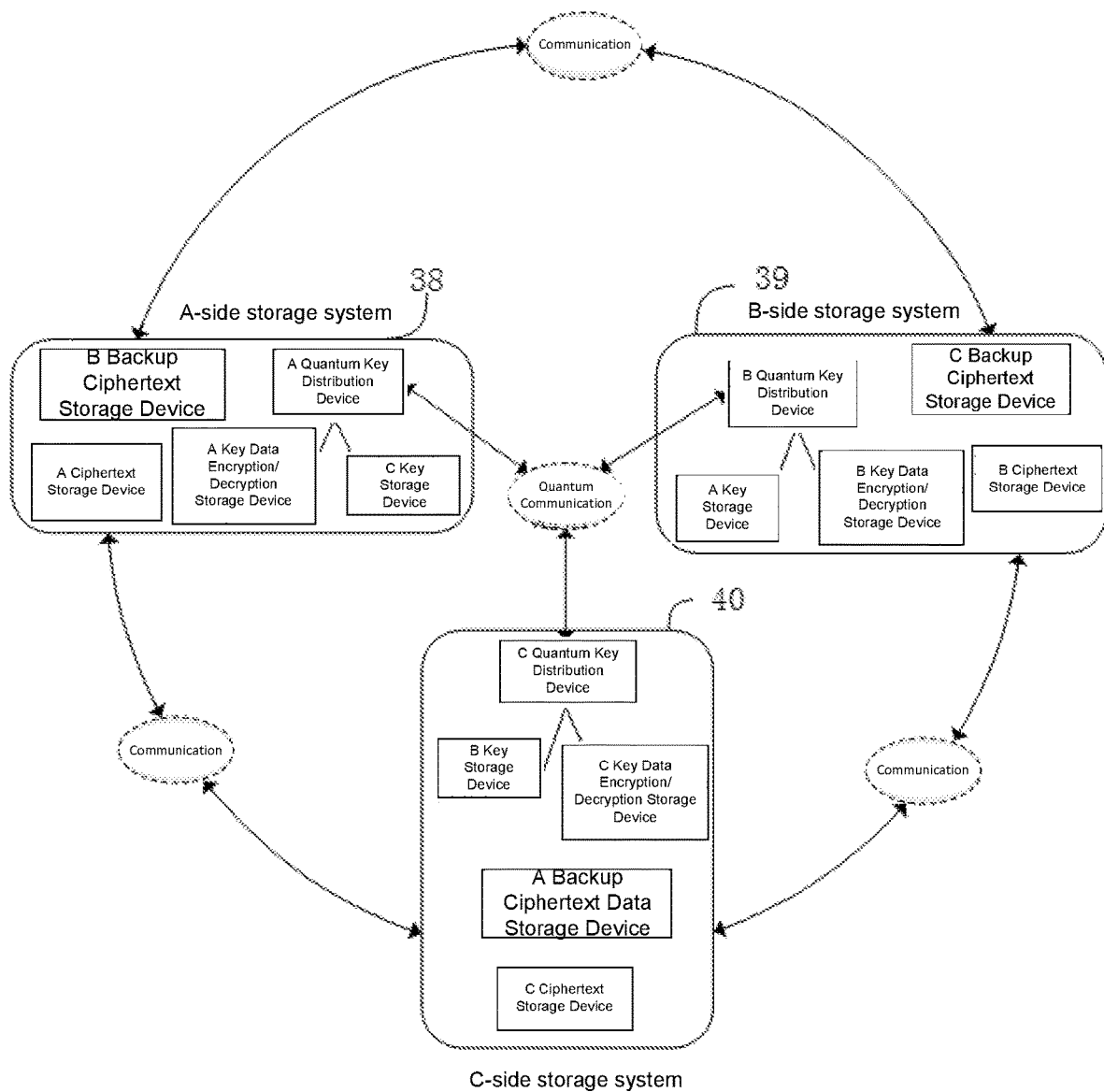
FIG. 9 is a schematic structural diagram of the eighth embodiment of the present disclosure.

Referring to FIG. 9, FIG. 9 only illustrates the application of the offsite key storage system 2 and data encryption/ decryption storage system 3 in three data storage terminals, that is, FIG. 9 illustrates the architecture principle of establishing data security guarantee between three storage terminals when they trust each other. This architecture completes the combination of the offsite key storage and data encryption/decryption storage device 9 with the database backup device, which greatly improves data security and database backup reliability. At the same time, it reduces the number of quantum key distribution devices and saves the deployment cost. The specific structure is as follows.

FIG. 9 shows a three point-database encryption application and key backup system, where the database application system may be a structured database application system, or an unstructured database application system, or a cloud storage application system. The system structure includes a key control center 1, an A-side storage system 38, a B-side storage system 39, and a C-side storage system 40.

The A-side storage system 38 includes the A quantum key distribution device, the A key data encryption/decryption storage device, the C key storage device, the A ciphertext storage device, and the B backup ciphertext storage device. The B-side storage system 39 includes the B quantum key distribution device, the B key data encryption/decryption storage device, the A key storage device, the B ciphertext storage device, and the C backup ciphertext storage device. The C-side storage system 40 includes the C quantum key distribution device, the C key data encryption/decryption storage device, the B key storage device, the C ciphertext storage device, and the A backup ciphertext storage device. The quantum key distribution devices on the A, B, and C sides are connected through quantum communication to form a quantum key distribution between any two points of AB, AC, and BC, and the keys do not interfere with or influence each other. The B backup ciphertext storage device in the A-side storage system 38 is communicatively connected with the B ciphertext storage device in the B-side storage system 39 to implement the backup of the B ciphertext storage device in the A-side storage system 38. The C backup ciphertext storage device in the B-side storage system 39 is communicatively connected with the C ciphertext storage device in the C-side storage system 40 to implement the backup of the C ciphertext storage device in the B-side storage system 39. The A backup ciphertext storage device in the C-side storage system 40 is communicatively connected with the A ciphertext storage device in the A-side storage system 38 to implement the backup of the A ciphertext storage device in the C-side storage system 40.

The A key data encryption/decryption storage device in the A-side storage system 38, the B key data encryption/decryption storage device in the B-side storage system 39, and the C key data encryption/decryption storage device in the C-side storage system 40 are all derivation of the data encryption/decryption storage device 9 in FIG. 1, that is, a decryption key storage device 5 is added to the data encryption/decryption storage device 9. These devices are communicatively connected to each other, and the communication connection is limited to the security zone. These devices are physically deployed in separate storage devices and are physically isolated from other devices. The data encryption/decryption storage device 9 of the A key data encryption/decryption storage device in the A-side storage system 38 encrypts the A data, and stores the encrypted ciphertext in the A ciphertext storage device. The ciphertext in the A ciphertext storage device is then backed up to the A backup ciphertext storage device in the C-side storage system 40 through communication, and the decryption key of the A data is stored in the A key storage device in the B-side storage system 39 (that is, the key storage device 5 in the offsite key storage system 2 in FIG. 1). Similarly, the data encryption/decryption storage device 9 of the B key data encryption/decryption storage device in the B-side storage system 39 encrypts the B data, and stores the encrypted ciphertext in the B ciphertext storage device. The ciphertext in the B ciphertext storage device is then backed up to the B backup ciphertext storage device in the A-side offsite key storage system 2 through communication, and the decryption key of the B data is stored in the B key storage device in the C-side storage system 40. Similarly, the data encryption/decryption storage device 9 in the C key data encryption/decryption storage device in the C-side storage system 40 encrypts the data, and stores the encrypted ciphertext in the C ciphertext storage device. The ciphertext in the C ciphertext storage device is then backed up to the C backup ciphertext storage device in the B-side storage system 39 through communication, and the decryption key of the C data is stored in the C key storage device in the A-side storage system 38.

The C key storage device in the A-side storage system 38, the A key storage device in the B-side storage system 39, and the B key storage device in the C-side storage system 40 belong to the offsite key storage system 2 in FIG. 1. The method of offsite key storage and database encryption among three points is thus realized, that is, the decryption key of the A data is stored in the area where B-side is located, the decryption key of the B data is stored in the area where C-side is located, and the decryption key of the C data is stored in the area where A-side is located. This method is not only helpful to improve the security of database storage, but also to reduce the cost of establishing a storage security system in A, B, and C, respectively. In this embodiment, the key control center 1 controls, through the key control device, the A quantum key distribution device, the B quantum key distribution device, and the C quantum key distribution device to operate, respectively.

Figure 10:
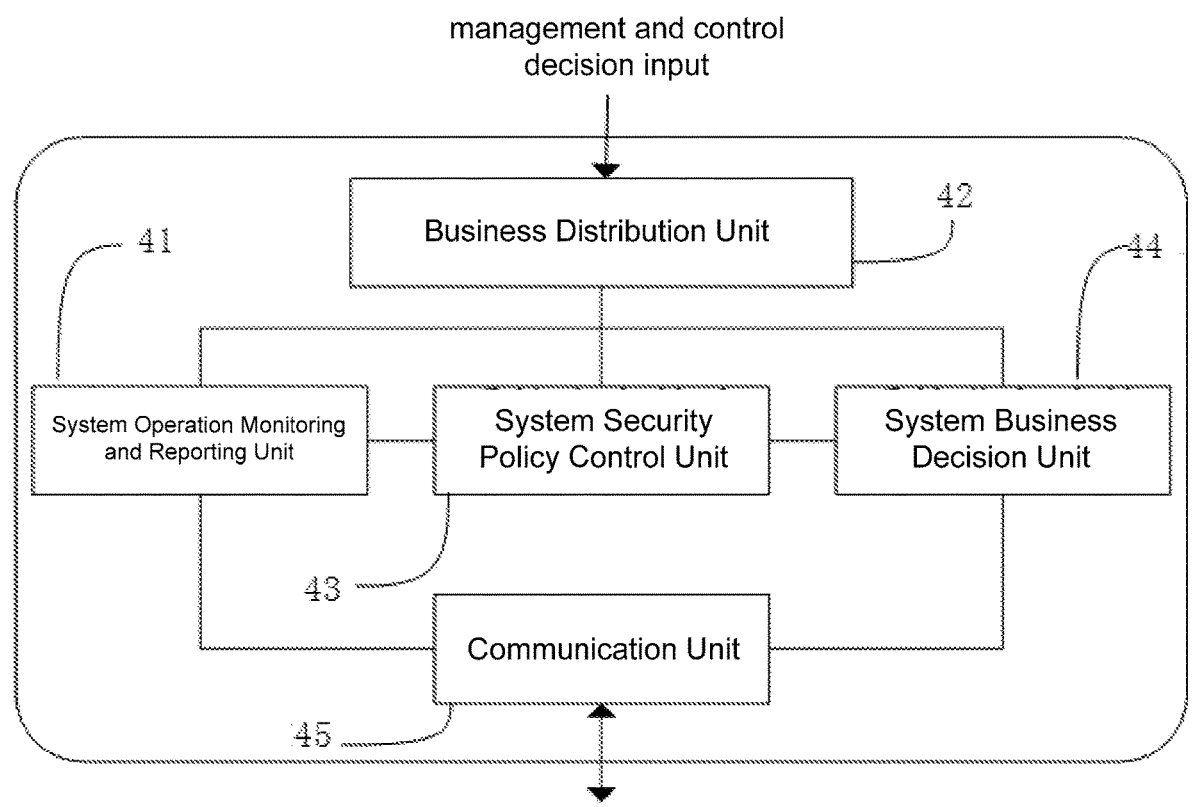
FIG. 10 is a schematic diagram of the internal structure of the key control center of the present disclosure.

Referring to FIG. 10, the key control center 1 includes a business distribution unit 42, a system operation monitoring and reporting unit 41, a system business decision unit 44, a system security policy control unit 43, and a communication unit 45. The system security policy control unit 43 presets a security policy, responds to management and control decision inputs in real time, forms decision data, and responds to business processing requests from the system operation monitoring and reporting unit 41 and the system business decision unit 44. The management and control decision input is issued by the administrator according to relevant regulations and business requirements. The business processing request is generated by the coordinated operation of the offsite key storage system 2 and the data encryption/decryption storage system 3, including system status reporting, processes control request, processing result report, and the like.

It may be known from the above embodiments that the present disclosure securely and reliably realizes separate storage of encryption/decryption keys and data at different locations, guarantees security unconditionally in the transmission process of encryption/decryption keys, and improves data storage security, which is impossible for traditional cryptographic techniques. The present disclosure may be widely applied to the encryption protection technology of structured databases, unstructured databases, cloud security, and disaster recovery data, and solves the data security issues existing in database storage, access, cloud storage and computing, disaster recovery and data transmission, thereby increasing the level of data security protection.

The key storage terminal (offsite key storage system 2) of the present disclosure is small in size and low in power consumption, convenient to set a higher level of security protection, and accordingly improves the security level of data storage. The key storage terminal (offsite key storage system 2) and the data storage terminal (data encryption/decryption storage system 3) referred to in the present disclosure are stored in different locations, and the distance between them may be controlled arbitrarily, which comprehensively improves the security of data storage, eases disaster prevention, and reduces the cost of data security protection. According to an optimization scheme of the present disclosure, after the data content is accessed or changed, a new key is used to replace the old key, and the data is re-encrypted and stored. The encryption key update mechanism further increases the security of data storage.

The differences between the present disclosure and the current encrypted transmission system in the quantum encryption network are as follows:

1. In the present disclosure, the key used to protect data is stored at different locations; while in the latter, the key used to protect the data stream in the network transmission channel is stored locally.

2. The present disclosure is preferably applied to the field of data storage, in particular to provide a secure and reliable encryption key for data encryption storage and a secure and reliable decryption key for ciphertext access; while the latter is applied to the field of data transmission, to provide anti-disclosure transmission security mechanism for flowing data.

3. The present disclosure is preferably applied to data backup. The ciphertext at the data storage terminal (data encryption/decryption storage system 3) may be arbitrarily backed up. The security of the backup data stream has nothing to do with the information transmission pipeline, and the problem of high security guarantee of end-to-end data flow is solved; while the latter is difficult to solve the "last mile" data transmission security, and the security of the end-to-end data flow is not high enough.

The protection scope of the present disclosure includes, but is not limited to, the above embodiments. The protection scope of the present disclosure is subject to the claims. Any replacement, deformation, and improvement easily made by those skilled in the art made to this technology fall into the protection scope of the present disclosure.

What is claimed is:

1. An encrypted data storage system based on offsite key storage, comprising: a key control center, an offsite key storage system, and a data encryption/decryption storage system, the offsite key storage system comprising a first key control device, a key storage device, and a first quantum key distribution device, the data encryption/decryption storage system comprising a second key control device, a data encryption/decryption storage device, and a second quantum key distribution device;

wherein the key control center is communicatively connected with the first key control device, the key control center is communicatively connected with the second key control device, the first quantum key distribution device is in quantum communication connection with the second quantum key distribution device, the first key control device is communicatively connected with the key storage device and the first quantum key distribution device, respectively, the key storage device is communicatively connected with the first quantum key distribution device, the second key control device is communicatively connected with the data encryption/decryption storage device and the second quantum key distribution device, respectively, and the data encryption/decryption storage device and the second quantum key distribution device is communicatively connected;

a data encryption/decryption storage device feeds back an encryption request to a second key control device according to input data, and the second key control device feeds back the encryption request to a key control center;

the key control center receives the encryption request fed back by the second key control device, after the encryption request is authorized by the key control center, the key control center sends control information to a first key control device and the second key control device;

the first key control device sends control information to a first quantum key distribution device, and the second key control device sends control information to a second quantum key distribution device;

the first quantum key distribution device and the second quantum key distribution device generate a pair of identical quantum keys through quantum communication, and two quantum keys comprised in the pair of identical quantum keys are referred to as a first quantum key and a second quantum key, respectively, the first quantum key distribution device sends the generated first quantum key to a key storage device, and the second quantum key distribution device sends the generated second quantum key to the data encryption/decryption storage device;

the key storage device stores the first quantum key and marks the first quantum key as $T_k$, the data encryption/decryption storage device encrypts the input data through the second quantum key to obtain ciphertext, the data encryption/decryption storage device marks the ciphertext as $T_d$ and outputs it to a ciphertext storage device;

the key storage device feeds back a result that the first quantum key is marked as $T_k$ to the key control center through the first key control device, the data encryption/decryption storage device feeds back a result that the ciphertext is marked as $T_d$ to the key control center through the second key control device, wherein, adopting quantum key distribution technology to realize data encryption storage further comprises the following steps, wherein the data encryption/decryption storage device feeds back a decryption request to the second key control device according to the mark $T_d$ of input ciphertext, and the second key control device feeds back the decryption request to the key control center;

the key control center receives the decryption request of the ciphertext marked as $T_d$, after the decryption request is authorized by the key control center, the key control center sends control information to the first key control device and the second key control device;

the first key control device sends control information to the first quantum key distribution device, the first key control device fetches the first quantum key marked as $T_k$ from the key storage device based on the mark $T_d$ of the ciphertext, and the first key control device uses the quantum key marked as $T_k$ as a decryption key for the decryption request;

the second key control device sends control information to the second quantum key distribution device;

the first quantum key distribution device and the second quantum key distribution device generate a pair of identical quantum keys through quantum communication, and two quantum keys comprised in the pair of identical quantum keys are referred to as a third quantum key and a fourth quantum key, respectively, the first quantum key distribution device sends the generated third quantum key to the first key control device, and the second quantum key distribution device sends the generated fourth quantum key to the second key control device;

the first key control device performs encryption processing on the third quantum key and the decryption key to form a ciphertext, and the first key control device sends the ciphertext to the second key control device;

the second key control device performs decryption processing on the ciphertext according to the fourth quantum key same as the third quantum key to decrypt the decryption key, and the second key control device sends the decryption key to the data encryption/decryption storage device:

the data encryption/decryption storage device performs decryption processing on the input ciphertext marked as $T_d$ according to the decryption key and outputs the decrypted data;

the data encryption/decryption storage device feeds back a decryption result to the key control center through the second key control device.

2. The encrypted data storage system based on offsite key storage of claim 1, wherein, the data encryption/decryption storage system further comprises a ciphertext storage device, the ciphertext storage device is communicatively connected with the data encryption/decryption storage device, the data encryption/decryption storage device comprises an input end and an output end, the input end of the data encryption/decryption storage device is used for inputting data, and the output end of the data encryption/decryption storage device is used for outputting data that has been encrypted or decrypted by the data encryption/decryption storage device.

3. The encrypted data storage system based on offsite key storage of claim 1, wherein, both the first quantum key distribution device and the second quantum key distribution device use a quantum key distribution terminal.

4. The encrypted data storage system based on offsite key storage of claim 1, wherein, the offsite key storage system and the data encryption/decryption storage system both are individual or multiple, the individual or multiple offsite key storage systems are communicatively connected with the key control center, the individual or multiple offsite key storage systems and the individual or multiple data encryption/decryption storage systems are offsite storage, and the offsite storage refers to spatially separated storage.

5. The encrypted data storage system based on offsite key storage of claim 4, wherein, the encrypted data storage system based on offsite key storage further comprises a first optical quantum switching device and a second optical quantum switching device, each of the first quantum key distribution devices in the individual or multiple offsite key storage systems is connected to the first optical quantum switching device through an optical fiber, each of the second quantum key distribution devices in the individual or multiple data encryption/decryption storage systems is connected to the second optical quantum switching device through an optical fiber, and the first optical quantum switching device is connected to the second optical quantum switching device via an optical fiber through quantum communication.

6. The encrypted data storage system based on offsite key storage of claim 4, wherein, the encrypted data storage system based on offsite key storage further comprises a first optical quantum wavelength division multiplexing device and a second optical quantum wavelength division multiplexing device, each of the first quantum key distribution devices in the individual or multiple offsite key storage systems is connected to the first optical quantum wavelength division multiplexing device through an optical fiber, each of the second quantum key distribution devices in the individual or multiple data encryption/decryption storage systems is connected to the second optical quantum wave division multiplexing device through an optical fiber, and the first optical quantum wavelength division multiplexing device is connected to the second optical quantum wavelength division multiplexing device via an optical fiber through quantum communication.

7. The encrypted data storage system based on offsite key storage of claim 1, wherein, the encrypted data storage system based on offsite key storage further comprises a ciphertext backup storage system, which comprises a backup ciphertext storage device, the ciphertext storage device is communicatively connected with the backup ciphertext storage device in the ciphertext backup storage system, the backup ciphertext storage device in the ciphertext backup storage system and the ciphertext storage device are offsite storage, the ciphertext storage device and the key storage device in the offsite key storage system are offsite storage, and the offsite storage refers to spatially separated storage.

8. The encrypted data storage system based on offsite key storage of claim 7, wherein, the encrypted data storage system based on offsite key storage further comprises a key offsite backup storage system, the key offsite backup storage system comprises a key backup storage device, the key backup storage device is communicatively connected with the key storage device, the key backup storage device and the key storage device are offsite storage, and the offsite storage refers to spatially separated storage.

9. The encrypted data storage system based on offsite key storage of claim 1, wherein, the encrypted data storage system based on offsite key storage further comprises a key offsite backup storage system, the key offsite backup storage system comprises a key backup storage device, the key backup storage device is communicatively connected with the key storage device, the key backup storage device and the key storage device are offsite storage, and the offsite storage refers to spatially separated storage.

10. An encrypted data storage method based on offsite key storage, the method comprising: adopting quantum key distribution technology, by both a key storage system and a data encryption/decryption storage system, to realize data encryption storage, wherein, adopting quantum key distribution technology to realize data encryption storage specifically comprises the following steps, wherein a data encryption/decryption storage device feeds back an encryption request to a second key control device according to input data, and the second key control device feeds back the encryption request to a key control center;

the key control center receives the encryption request fed back by the second key control device, after the encryption request is authorized by the key control center, the key control center sends control information to a first key control device and the second key control device;

the first key control device sends control information to a first quantum key distribution device, and the second key control device sends control information to a second quantum key distribution device;

the first quantum key distribution device and the second quantum key distribution device generate a pair of identical quantum keys through quantum communication, and two quantum keys comprised in the pair of identical quantum keys are referred to as a first quantum key and a second quantum key, respectively, the first quantum key distribution device sends the generated first quantum key to a key storage device, and the second quantum key distribution device sends the generated second quantum key to the data encryption/decryption storage device;

the key storage device stores the first quantum key and marks the first quantum key as $T_k$, the data encryption/decryption storage device encrypts the input data through the second quantum key to obtain ciphertext, the data encryption/decryption storage device marks the ciphertext as $T_d$ and outputs it to a ciphertext storage device;

the key storage device feeds back a result that the first quantum key is marked as $T_k$ to the key control center through the first key control device, the data encryption/decryption storage device feeds back a result that the ciphertext is marked as $T_d$ to the key control center through the second key control device, wherein, adopting quantum key distribution technology to realize data encryption storage further comprises the following steps, wherein the data encryption/decryption storage device feeds back a decryption request to the second key control device according to the mark $T_d$ of input ciphertext, and the second key control device feeds back the decryption request to the key control center;

the key control center receives the decryption request of the ciphertext marked as $T_d$, after the decryption request is authorized by the key control center, the key control center sends control information to the first key control device and the second key control device;

the first key control device sends control information to the first quantum key distribution device, the first key control device fetches the first quantum key marked as $T_k$ from the key storage device based on the mark $T_d$ of the ciphertext, and the first key control device uses the first quantum key marked as $T_k$ as a decryption key for the decryption request;

the second key control device sends control information to the second quantum key distribution device;

the first quantum key distribution device and the second quantum key distribution device generate a pair of identical quantum keys through quantum communication, and two quantum keys comprised in the pair of identical quantum keys are referred to as a third quantum key and a fourth quantum key, respectively, the first quantum key distribution device sends the generated third quantum key to the first key control device, and the second quantum key distribution device sends the generated fourth quantum key to the second key control device;

the first key control device performs encryption processing on the third quantum key and the decryption key to form a ciphertext, and the first key control device sends the ciphertext to the second key control device;

the second key control device performs decryption processing on the ciphertext according to the fourth quantum key same as the third quantum key to decrypt the decryption key, and the second key control device sends the decryption key to the data encryption/decryption storage device:

the data encryption/decryption storage device performs decryption processing on the input ciphertext marked as $T_d$ according to the decryption key and outputs the decrypted data;

the data encryption/decryption storage device feeds back a decryption result to the key control center through the second key control device.

* * * * *